United States Patent
Tang et al.

(10) Patent No.: US 12,406,297 B2
(45) Date of Patent: Sep. 2, 2025

(54) GENERATION OF GRAPHICS FOR VEHICLE ITEMS

(71) Applicant: Capital One Services, LLC, McLean, VA (US)

(72) Inventors: Qiaochu Tang, Frisco, TX (US); Derek Bumpas, Allen, TX (US); Jeremy Jaylee Huang, Plano, TX (US); Jiaxin Guo, Plano, TX (US); Michelle Emamdie, Saint Augustine, FL (US)

(73) Assignee: Capital One Services, LLC, McLean, VA (US)

( * ) Notice: Subject to any disclaimer, the term of this patent is extended or adjusted under 35 U.S.C. 154(b) by 304 days.

(21) Appl. No.: 17/455,101

(22) Filed: Nov. 16, 2021

(65) Prior Publication Data

US 2023/0153896 A1 May 18, 2023

(51) Int. Cl.
| | |
|---|---|
| *G06Q 30/00* | (2023.01) |
| *G06F 9/451* | (2018.01) |
| *G06N 5/022* | (2023.01) |
| *G06Q 30/0601* | (2023.01) |
| *G06Q 40/08* | (2012.01) |

(52) U.S. Cl.
CPC ......... *G06Q 30/0643* (2013.01); *G06F 9/451* (2018.02); *G06N 5/022* (2013.01); *G06Q 30/0623* (2013.01); *G06Q 40/08* (2013.01)

(58) Field of Classification Search
CPC ........... G06Q 30/0643; G06Q 30/0623; G06Q 40/08; G06F 9/451; G06N 5/022
See application file for complete search history.

(56) References Cited

U.S. PATENT DOCUMENTS

| | | |
|---|---|---|
| 9,818,158 B1 | 11/2017 | Devereaux et al. |
| 10,796,373 B2 | 10/2020 | Diefendorf et al. |
| 11,107,164 B1* | 8/2021 | Davis ................ H04R 1/403 |

(Continued)

FOREIGN PATENT DOCUMENTS

WO  2021/004121 A1  1/2021

OTHER PUBLICATIONS

Nouh R, Singh M, Singh D. "SafeDrive: Hybrid Recommendation System Architecture for Early Safety Predication Using Internet of Vehicles." Sensors (Basel). Jun. 4, 2021;21(11):3893. doi: 10.3390/s21113893. PMID: 34199981; PMCID: PMC8200186. (Year: 2021).*

*Primary Examiner* — Anand Loharikar
(74) *Attorney, Agent, or Firm* — Bookoff McAndrews, PLLC

(57) ABSTRACT

A computer-implemented method of generating a graphic for a vehicle item may include: causing a user device to display a user interface indicative of one or more vehicles; receiving, from the user device, vehicle selection information, the vehicle selection information indicative of a vehicle selected by a user; obtaining, from a database, user data corresponding to the user; generating, using a machine learning model, a first score corresponding to a first vehicle item based on the user data; determining whether the first score exceeds a first predetermined score threshold; generating, in response to a determination that the first score exceeds the first predetermined score threshold, a first graphic indicative of the first vehicle item; and causing the user device to display the first graphic via the user interface.

20 Claims, 5 Drawing Sheets

(56) References Cited

U.S. PATENT DOCUMENTS

| | | | |
|---|---|---|---|
| 2015/0324885 A1* | 11/2015 | Griffin | G06Q 30/0643 |
| | | | 705/26.5 |
| 2016/0035008 A1* | 2/2016 | Griffin | G06Q 30/012 |
| | | | 705/26.81 |
| 2016/0078403 A1* | 3/2016 | Sethi | G06Q 10/0875 |
| | | | 705/26.81 |
| 2021/0166103 A1* | 6/2021 | Jackson | G06N 3/088 |
| 2021/0224666 A1* | 7/2021 | Kawashima | G07C 5/0808 |

* cited by examiner

300

302 — CAUSE A USER DEVICE TO DISPLAY A USER INTERFACE INDICATIVE OF ONE OR MORE VEHICLES

304 — RECEIVE VEHICLE SELECTION INFORMATION

306 — OBTAIN USER DATA CORRESPONDING TO THE USER

308 — GENERATE A FIRST SCORE CORRESPONDING TO A FIRST VEHICLE ITEM BASED ON THE USER DATA

310 — DETERMINE WHETHER THE FIRST SCORE EXCEEDS A FIRST PREDETERMED THRESHOLD

312 — GENERATE A FIRST GRAPHIC INDICATIVE OF THE FIRST VEHICLE ITEM

314 — CAUSE THE USER DEVICE TO DISPLAY THE FIRST GRAPHIC

END

FIG. 3

GENERATION OF GRAPHICS FOR VEHICLE ITEMS

TECHNICAL FIELD

Various embodiments of the present disclosure relate generally to systems and methods for generating graphics for vehicle items.

BACKGROUND

As commerce in general continues to move online from brick-and-mortar marketplaces, the purchasing of vehicles is no exception. Traditionally, a vehicle purchase may have been made at a dealership with the assistance of a salesperson. The salesperson may have been able to ascertain a vehicle purchaser's preferences and personal circumstances to recommend useful complementary vehicle items to purchase with a vehicle. For online vehicle purchasing, however, a salesperson may be absent from the process, leaving a purchaser to navigate generic, electronically generated menus without guidance.

The present disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods for generating graphics for vehicle items are described.

In one example, a computer-implemented method of generating a graphic for a vehicle item may include: causing a user device to display a user interface indicative of one or more vehicles; receiving, from the user device, vehicle selection information, the vehicle selection information indicative of a vehicle selected by a user; obtaining, from a database, user data corresponding to the user, the user data including one or more of (1) a set of user interaction data and (2) prior vehicle information for one or more prior vehicles associated with the user; generating, using a machine learning model, a first score corresponding to a first vehicle item based on the user data, wherein the machine learning model may be: trained to learn associations between at least (i) a set of user population data and (ii) a set of vehicle item selections, wherein each of the vehicle item selections corresponds to a subset of the user population data; and configured to generate the first score based on the first vehicle item using the learned associations; determining whether the first score exceeds a first predetermined score threshold; generating, in response to a determination that the first score exceeds the first predetermined score threshold, a first graphic indicative of the first vehicle item; and causing the user device to display the first graphic via the user interface.

In another example, a computer-implemented method of generating a graphic for a vehicle item may include: causing a user device to display a user interface indicative of one or more vehicles; receiving, from the user device, vehicle selection information, the vehicle selection information being indicative of a vehicle selected by a user; obtaining, from a database, user data corresponding to the user, the user data including (1) prior vehicle information for one or more prior vehicles associated with the user and (2) prior vehicle item information for one or more prior vehicle items associated with the one or more prior vehicles; determining, based on the user data, whether a first vehicle item matches at least one of the prior vehicle items; generating, in response to a determination that the first vehicle item matches at least one of the prior vehicle items, a first graphic indicative of the first vehicle item; and causing the user device to display the first graphic via the user interface.

In a further example, a system for generating a graphic for a vehicle item may include: one or more memories storing instructions and a machine learning model, wherein the machine learning model may be: trained to learn associations between at least (i) a set of user population data and (ii) a set of vehicle item selections, each of the vehicle item selections corresponding to a subset of the user population data; and configured to generate scores based on vehicle items using the learned associations; and one or more processors operatively connected to the one or more memories. The one or more processors may be configured to execute the instructions to: cause a user device to display a user interface indicative of one or more vehicles; receive, from the user device, vehicle selection information, the vehicle selection information being indicative of a vehicle selected by a user; obtain, from a database, user data corresponding to the user, the user data including one or more of (1) a set of user interaction data and (2) prior vehicle information for one or more prior vehicles associated with the user; generate, using the machine learning model, a first score corresponding to a first vehicle item and a second score corresponding to a second vehicle item based on the user data; determine whether the first score exceeds a first predetermined score threshold; determine whether the second score exceeds a second predetermined score threshold; generate, in response to a determination that the first score exceeds the first predetermined score threshold and that the second score does not exceed the second predetermined threshold, a graphic indicative of the first vehicle item and not the second vehicle item; and cause the user device to display the graphic via the user interface of the user device.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flowchart of an exemplary method of generating a graphic for a vehicle item, according to one or more embodiments.

DETAILED DESCRIPTION OF EMBODIMENTS

Figure 1:
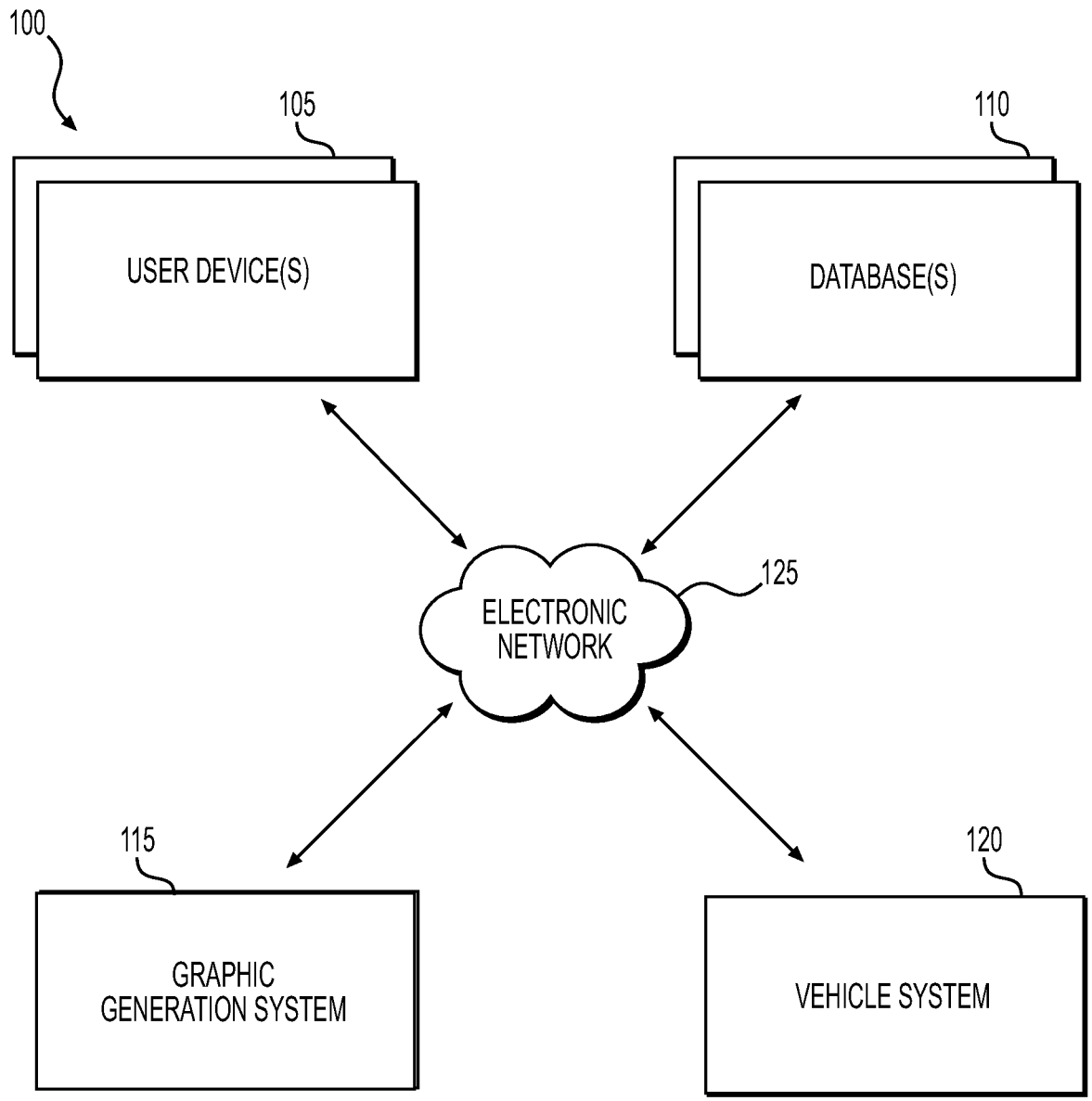
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "vehicle item" or the like, as used herein, generally refers to a complementary product associated with a vehicle and may encompass a warranty, service agreement, vehicle insurance policy, and the like, or any other agreement or policy related to a vehicle, or any vehicle accessory.

In general, the present disclosure is directed to systems and methods for generating graphics for vehicle items. The systems and methods according to the present disclosure offer significant technical benefits which will become apparent.

In recent years, personal purchases, including vehicle purchases, have occurred more and more frequently online as opposed to in-person at brick-and-mortar marketplaces and dealerships. While online commerce may offer certain advantages, including convenience, competition, and/or access to huge amounts of inventory, online commerce may also have shortcomings. For example, online commerce most often occurs without exposure of a purchaser to a knowledgeable salesperson for assistance.

While not all purchases necessitate the assistance of a salesperson, more complex transactions, such as vehicle purchases, have historically been made with such assistance at dealerships. At a dealership, a knowledgeable salesperson may assist a purchaser not only by matching the purchaser to a desired vehicle, but also by learning about and understanding the purchaser's particular preferences and circumstances with respect to vehicle items for the vehicle. With such personalized assistance, the salesperson may have been able to help the purchaser navigate a confusing and convoluted field of vehicle items to identify one or more vehicle items appropriate for the particular purchaser.

In contrast to an in-person vehicle purchasing experience with the help of a knowledgeable salesperson, conventional online vehicle purchases may be generic, untailored to a particular purchaser, and/or fail to offer assistance form any salesperson. As such, in the process of purchasing a vehicle online, the purchaser may be presented with graphical representations of vehicle items in an unsophisticated manner. For example, in some situations, every available vehicle item for a vehicle may be presented to the purchaser without regard for the purchaser's preferences or circumstances. Alternatively, the purchaser may be presented with a random subset of vehicle items for a vehicle. As a result, the purchaser may have to navigate a set of vehicle items that is either too large to allow the purchaser to make an informed decision, or incomplete and potentially suppressing the most desirable vehicle items. Accordingly, the purchaser may select sub-optimal vehicle items for their preferences and/or circumstances, or may forego vehicle items altogether due to the difficulty of identifying and selecting desirable vehicle items.

Accordingly, a need exists to address the foregoing challenges. Particularly, a need exists to improve systems and methods for generating graphics indicative of vehicle items. Embodiments of the present disclosure offer technical solutions to address the foregoing needs, as well as other needs.

FIG. 1 depicts an exemplary computing environment 100 that may be utilized with techniques presented herein. One or more user device(s) 105, one or more databases 110, a graphic generation system 115, and a vehicle system 120 may communicate across an electronic network 125. The user device 105 may be associated with, and used by, a user. The systems and devices of the computing environment 100 may communicate in any arrangement. As will be discussed herein, systems and/or devices of the computing environment 100 may communicate in order to generate and display graphics for vehicle items.

The user device 105 may be a computer system such as, for example, a desktop computer, a mobile device, etc. In an exemplary embodiment, the user device 105 may be a cellphone, a tablet, or the like. In some embodiments, the user device 105 may include one or more electronic application(s), e.g., a program, plugin, browser extension, etc., installed on a memory of the user device 105. In some embodiments, the electronic application(s) may be associated with one or more of the other components in the computing environment 100. For example, the electronic application(s) may include a web browser, another application, or the like configured to obtain information from database 110 or vehicle system 120. The electronic application(s) may further be configured to obtain graphics generated by the graphic generation system 115 and display the graphics on the user device 105.

In some embodiments, user device 105 may be configured to allow a user to browse and/or purchase vehicles and vehicle items. For example, user device 105 may include a browser configured to allow the user to navigate to a vehicle vendor's website or an electronic application dedicated to a specific vehicle vendor. User device 105 may obtain information relating to vehicles for sales from vehicle system 120. User device 105 may also obtain and display graphics generated by graphic generation system 115. The user device 105 may display graphics associated with vehicles and/or vehicle items. The graphics may include photographs, illustrations, other types of images, text, or any combination of the foregoing. The graphics displayed by the user device 105 may be selectable such that the user may purchase a vehicle and/or vehicle item in part by selecting a graphic associated with the vehicle and/or vehicle item. In some embodiments, user device 105 may be a personal device belonging to the user via which the user may browse for vehicles and vehicle items. In some embodiments, user device 105 may be a device belonging to a merchant, such as a vehicle dealer, that is operated primarily by the merchant. In some embodiments, user device 105 may be a device belonging to a merchant but operated primarily by a customer of the merchant during execution of a vehicle purchase.

Database 110 may store user data corresponding to the user of user device 105. The user data may comprise various data corresponding to the user, including user interaction data and prior vehicle information for one or more prior vehicles associated with the user. The user interaction data may include information corresponding to interactions in which the user has engaged. For example, in some embodiments, the interactions may be financial transactions and the user interaction data may include information such as identifications, locations, and times for each of the transactions. In some embodiments, the interactions may be social media interactions and may similarly include identifications, locations, and times for each of the social media interactions. In some embodiments, the interactions may be instances in which the user has navigated to a destination using a navigation application and may include identifications of the destinations, locations of the destination, and times of arrival at the destinations.

The prior vehicle information may include data for one or more prior vehicles associated with the user. In some embodiments, the prior vehicle information may include an identification of vehicles purchased or otherwise possessed by the user, information concerning vehicle items purchased with or for the vehicles, accident information indicative of any accidents or collisions involving the vehicles, and/or repair information indicative of any repairs made to the vehicles. The accident information may include an identification of the type of accident or collision, severity of the accident or collision, and/or insurance claims information for the accident or collision. Repair information may include an identification of a type of repair performed for the vehicle, a cost associated with a repair, and/or insurance claims information associated with a repair. The prior vehicle information may further include identifications of prior vehicle items selected for the prior vehicles. For example, for a vehicle possessed or otherwise purchased by the user, the prior vehicle information may include an identification of prior vehicle items purchased or otherwise selected for the vehicle.

Database 110 may also store user population data corresponding to a population of individuals including at least some individuals other than the user. The user population data may include information similar to the user data, but instead of being associated with the user of the user device, the user population data may include information associated with each individual of the population. The population data may therefore include, for example, interaction data and prior vehicle information corresponding to each individual of the population. The interaction data and prior vehicle information corresponding to each individual of the population may be similar to the user interaction data and prior vehicle information corresponding to the user.

Database 110 may be, for example, a database maintained by a financial institution and containing data corresponding to customers of the financial institution. In some embodiments, database 110 may be a database maintained by a social media service and containing data corresponding to members of the social media service. In some embodiments, database 110 may be a database maintained by an insurance provider, a navigation service, a government agency, or any other entity tasked with maintaining information of the type included in the user data and/or user population data described herein previously.

Graphic generation system 115 may be configured to generate graphics for display on user device 105. Graphics generated by graphic generation system 115 may represent vehicles available for sale and/or vehicle items associated with the vehicles for sale. Graphic generation system 115 may generate graphics based on user data from database 110. Graphic generation system 115 may further include a machine learning model trained to generate graphics based on user data from database 110 and vehicle selection information received from the user via user device 105. Training of the machine learning model is described hereinafter in further detail with reference to FIG. 2. In some embodiments, the machine learning model may be a logistic regression model.

Vehicle system 120 may store and/or provide information related to vehicles for sale and/or vehicle items associated with the vehicles for sale. For example, vehicle system 120 may include vehicle inventory information, such as identifications of vehicle makes, models, years, features, specifications, geographic location, as well as vehicle images and vehicle prices. Vehicle system 120 may further include an identification of vehicle items available for a particular vehicle. Vehicle system 120 may further include vehicle item information, such as price, specifications, coverage terms, coverage duration, etc. User device 105 and/or graphic generation system 115 may obtain information related to vehicles for sale and/or vehicle items for sale from vehicle system 120 and display the information to the user. Vehicle system 120 may further include vehicle item selections corresponding to previous purchasers of vehicles. The vehicle item selections may represent, for example, vehicle items purchased or otherwise selected with or for vehicles by purchasers of the vehicles. In some embodiments, the purchasers of the vehicles may be among the population of individuals described herein previously.

In various embodiments, the electronic network 125 may be a wide area network ("WAN"), a local area network ("LAN"), personal area network ("PAN"), or the like. In some embodiments, electronic network 125 may be a secured network. In some embodiments, the secured network may be protected by any of various encryption techniques. In some embodiments, electronic network 125 may include the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. For example, graphic generation system 115 may incorporate either or both of database 110 and/or vehicle system 120. Additionally, graphic generation system 115 may be incorporated within user device 105. Though certain examples are provided, any suitable arrangement of the various systems and devices of the computing environment 100 may be used.

Figure 2:
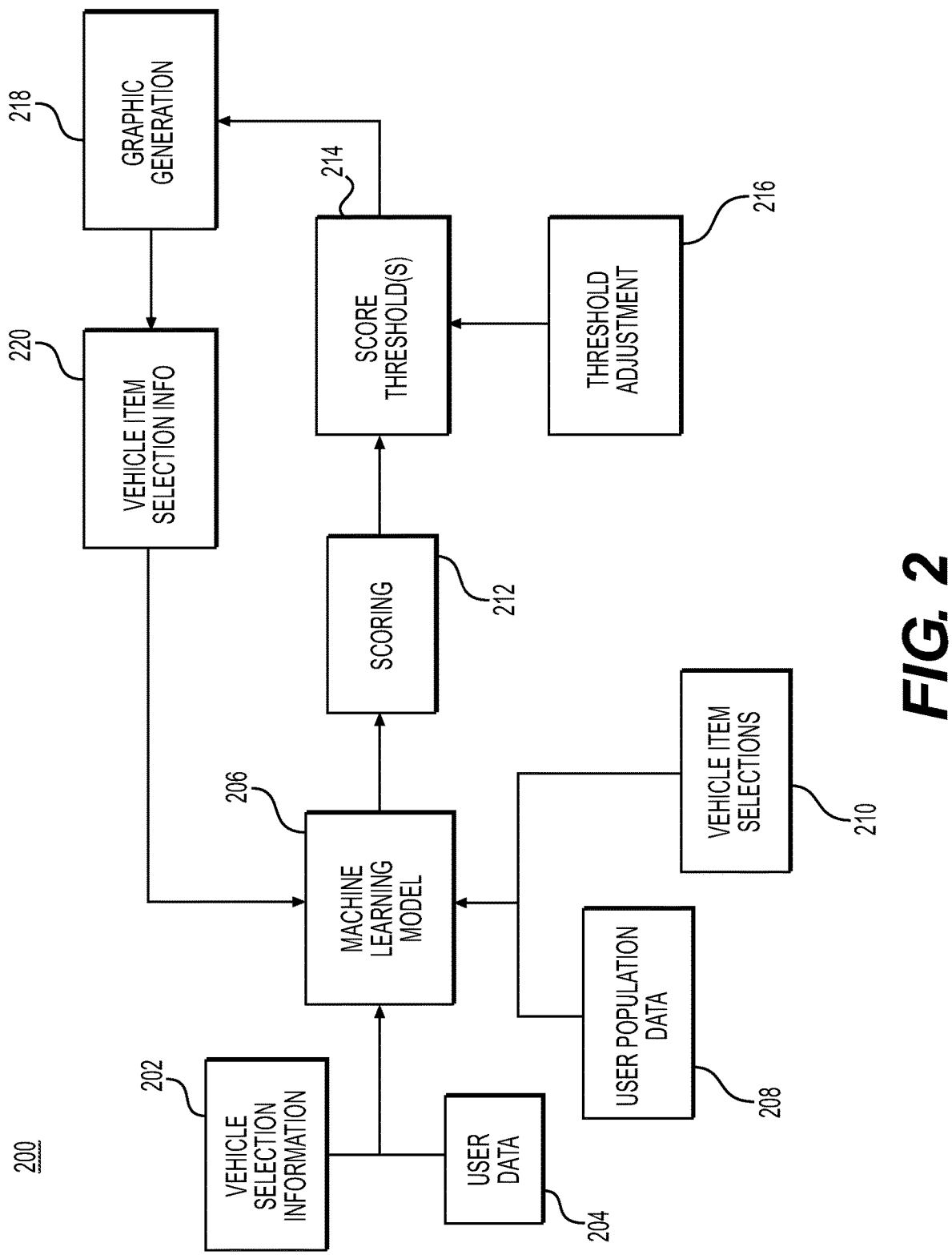
FIG. 2 depicts an exemplary process flow, according to one or more embodiments.

FIG. 2 illustrates an exemplary process flow 200 according to one or more embodiments. Process flow 200 may occur, for example, when a user operates user device 105 to browse vehicles for sale and make a vehicle selection. Vehicle selection information 202 may be obtained by user device 105 upon selection by the user of a vehicle for purchase and may be indicative of a particular vehicle selected by the user for purchase. Vehicle selection information 202 may further include an identification of vehicle items associated with the selected vehicle and available for purchase or selection by the user. Once vehicle selection information 202 is obtained by user device 105, vehicle selection information 202 may be transmitted by user device 105 to graphic generation system 115 and input to machine learning model 206. Graphic generation system 115 may further obtain user data 204 from database 110. User data 204 may include the information described herein previously with reference to FIG. 1. User data 204 may also be input to machine learning model 206.

Machine learning model 206 may be trained using training data sets. For example, user population data 208 and vehicle item selections 210 may be input to machine learning model 206 as training data and machine learning model 206 may be trained to learn associations between user population data 208 and vehicle item selections 210. User population data 208 may be obtained from database 110 for input to machine learning model 206 and may include the information described herein previously with reference to FIG. 1. Vehicle item selections 210 may be obtained from vehicle system 120 and may include the information described herein previously with reference to FIG. 1. Vehicle item selections 210 may include information for selections made by individuals represented by user population data 208. In other words, user population data 208 may include data related to at least one individual whose vehicle item selection information is included vehicle item selections 210. By training machine learning model 206 using these data sets, machine learning model 206 may be trained, in essence, to predict vehicle items a user may be likely to select and/or purchase based on available user data 204 associated with the user and vehicle selection information 202. Machine learning model 206 may be trained according to any suitable training protocol, including supervised training, semi-supervised training, self-supervised training, or unsupervised training.

It should be understood that machine learning model 206 need not necessarily be trained for each instance of a vehicle selection made by a user. In other words, once trained, machine learning model 206 may be used for different vehicle selections by the user and/or different users. In some embodiments, as discussed in more detail below, further information received from the user may be used to adjust, update, or retrain machine learning model 206.

Following training of machine learning model 206 and inputting of vehicle selection information 202 and user data 204 to machine learning model 206, machine learning model 206 may generate scoring 212. Scoring 212 may include a score corresponding to each of the vehicle items identified in vehicle selection information 202. The scores may be indicative of a likelihood that the user will purchase and/or select the corresponding vehicle item. For example, scores may be assigned on a scale of 0 to 100, where zero corresponds to a very low likelihood of selection by the user and 100 corresponds to a very high likelihood. It is to be understood that the format or scale for the scores is not to be limited to any particular format or scale, but rather may be any suitable format or scale, such as a scale from 0 to 1, a scale from 0 to 10, letter grades A through F, etc.

By generating scoring 212 based on vehicle selection information 202 and user data 204, machine learning model 206 may effectively use readily available information associated with the user to predict a likelihood that the user will purchase and/or select individual vehicle items for a vehicle. For example, trained as described herein, machine learning model 206 may utilize user interaction data for score generation, where the user interaction data may be indicative of travel patterns and, by extension, vehicle utilization. Machine learning model 206 may also factor in the user's history of vehicular accidents or vehicle repairs included in the prior vehicle information for score generation. Machine learning model 206 may further factor in the user's history of purchasing vehicle items from the prior vehicle information for score generation. All of the foregoing may lead to more accurate predictions of the user's likelihood of purchasing and/or selecting a particular vehicle item.

The scores of scoring 212 may then be compared to one or more score threshold(s) 214. Score threshold(s) 214 may serve, in essence, as a filter for vehicle items based on their associated scores. For example, if graphic generation system 115 determines that a score associated with a vehicle item exceeds one of the score threshold(s) 214, the vehicle item may proceed to graphic generation 218. If, on the other hand, graphic generation system 115 determines that the score associated with the vehicle item does not exceed the corresponding one of the score threshold(s) 214, the vehicle item may be excluded from graphic generation 218. Score threshold(s) 214 may be set to allow only vehicle items having scores indicative of a high likelihood of user selection to proceed to graphic generation 218. Score threshold(s) 214 may further be adjustable and receive threshold adjustment 216 as an input. Threshold adjustment 216 may be based on input by an administrator of graphic generation system 115. In some embodiments, the administrator may be a vehicle dealer, a vehicle item vendor, a vehicle financing entity, or the like.

For vehicle items having scores exceeding the corresponding score threshold(s) 214, the vehicle items may proceed to graphic generation 218 at which graphic generation system 115 may generate graphics indicative of the vehicle items. Graphic generation system 115 may further transmit the graphics to user device 105 and/or cause user device 105 to display the graphics to the user. The graphics may be selectable by the user such that selection of a graphic is indicative of the user selecting, purchasing, electing to purchase, and/or otherwise indicating preference for a vehicle item associated with the graphic. Upon any such selection or non-selection of vehicle items by the user, user device 105 may generate vehicle item selection information 220, indicative of vehicle item selections made by the user. Vehicle item selection information 220 may be transmitted from user device 105 to graphic generation system 115 and input to machine learning model 206 as additional training data. Machine learning model 206 may thus be trained to learn additional associations between vehicle selection information 202, user data 204 and vehicle item selection information 220. Inputting vehicle item selection information 220 to machine learning model 206 may therefore serve as a feedback loop by which machine learning model 206 is continuously updated.

Hereinafter, methods of using the computer environment 100 are described. In the methods described, various acts are described as performed or executed by one or more components shown in FIG. 1, such as user device 105, database 110, graphic generation system 115, or vehicle system 120. However, it should be understood that in various embodiments, various components or combinations of components of the computing environment 100 discussed above may execute instructions or perform acts including the acts discussed below. Further, it should be understood that in various embodiments, various steps may be added, omitted, and/or rearranged in any suitable manner.

FIG. 3 depicts an exemplary process 300 of generating a graphic for a vehicle item, according to one or more embodiments. It is to be understood that the process 300 may include fewer than all steps shown in FIG. 3 or may alternatively include additional steps not shown in FIG. 3.

At step 302, graphic generation system 115 may cause user device 105 to display a user interface indicative of one or more vehicles. User device 105 may display the user interface, for example, in response to the user navigating with a browser to a vehicle vendor's website or navigating to an electronic application dedicated to, or maintained by, the vehicle vendor. The user interface may be configured to prompt the user for vehicle selection information indicative of a vehicle. In some embodiments, the user interface may include selectable graphics indicative of the one or more vehicles.

At step 304, graphic generation system 115 may receive vehicle selection information from user device 105. The vehicle selection information may be indicative of a vehicle selected by the user via the user interface of user device 105. In some embodiments, the user may select the vehicle, for example, for purchase, lease, or temporary rental. In response to the vehicle selection made by the user, user device 105 may transmit the vehicle selection information to graphic generation system 115.

In response to receiving the vehicle selection information from user device 105, graphic generation system 115 may obtain user data corresponding to the user at step 306. Graphic generation system 115 may obtain the user data from database 110. In some embodiments, in response to receiving the vehicle selection information, graphic generation system 115 may transmit a request to database 110 for the user data and database 110 may transmit the user data to graphic generation system 115 in response to the request. The user data may be associated with the user of user device 105 and may include the information described herein previously with reference to FIG. 1.

At step 308, once graphic generation system 115 has obtained the user data, graphic generation system 115 may generate a first score corresponding to a first vehicle item based on the user data. Graphic generation system 115 may generate the first score using a trained machine learning model, as described herein previously. The first vehicle item may be a vehicle item associated with the vehicle selected by the user, or a vehicle item otherwise available for the vehicle selected by the user.

At step 310, graphic generation system 115 may determine whether the first score exceeds a first predetermined threshold. If graphic generation system 115 determines that the first score exceeds the first predetermined threshold, process 300 may proceed to step 312. If, on the other hand, graphic generation system 115 determines that the first score does not exceed the first predetermined threshold, process 300 may end.

At step 312, in response to a determination that the first score exceeds the first predetermined threshold, graphic generation system 115 may generate a first graphic indicative of the first vehicle item. The first graphic may be any graphic indicative or suggestive of the first vehicle item and suitable for display via the user interface of user device 105. At step 314, graphic generation system 115 may then cause user device 105 to display the graphic via the user interface.

While process 300 is depicted in FIG. 3 as referring to a first vehicle item, a first score, and a first predetermined threshold, it should be understood that steps 308 through 314 may be repeated for a second vehicle item, a third vehicle, or any number of vehicle items. In some embodiments, a second graphic indicative of a second vehicle item and/or a third graphic indicative of a third vehicle item may be displayed concurrently via the user interface of user device 105 with the first graphic.

It is to be understood that process 300 need not necessarily be performed in the exact order described herein and the steps described herein may be rearranged in some embodiments. Further, in some embodiments fewer than all steps of process 300 may be performed and in some embodiments additional steps may be performed.

Process 300 as described herein may allow for generation and display of graphics indicative of vehicle items having a high likelihood of being selected by a user, while excluding graphics indicative of vehicle items having a low likelihood of being selected by the user. By leveraging a machine learning model trained to learn associations between at least a set of user population data and a set of vehicle item selections, process 300 may promote presentation of desirable vehicle items to the user and suppress presentation of undesirable vehicle items, thereby improving user experience, saving the user time, and promoting selection by the user of desirable vehicle items.

Figure 4:
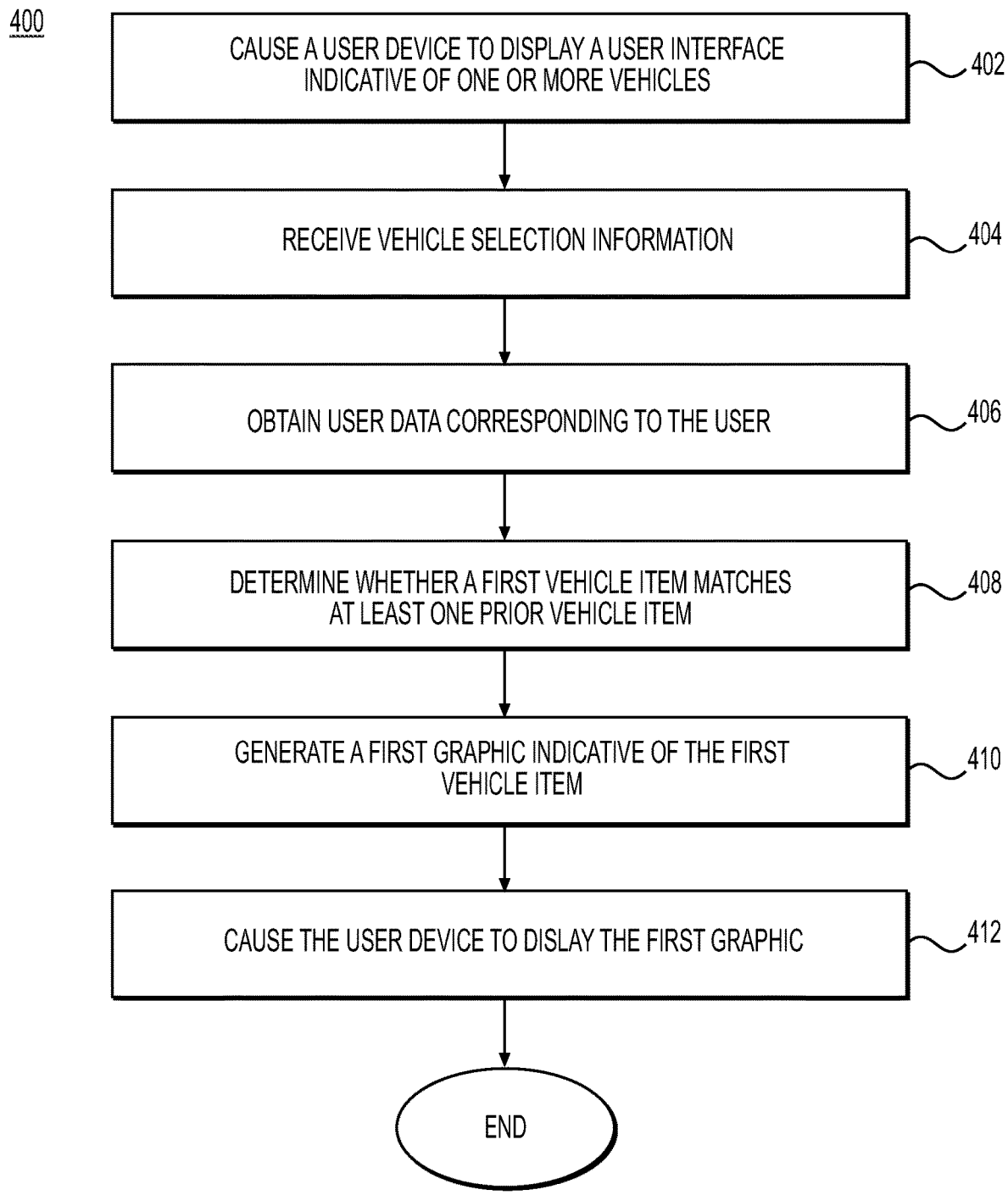
FIG. 4 depicts a flowchart of an exemplary method of generating a graphic for a vehicle item, according to one or more embodiments.

FIG. 4 depicts another exemplary process 400 of generating a graphic for a vehicle item, according to one or more embodiments. It is to be understood that the process 400 may include fewer than all steps shown in FIG. 4 or may alternatively include additional steps not shown in FIG. 4.

At step 402, graphic generation system 115 may cause user device 105 to display a user interface indicative of one or more vehicles. User device 105 may display the user interface, for example, in response to the user navigating with a browser to a vehicle vendor's website or navigating to an electronic application dedicated to or maintained by the vehicle vendor. The user interface may be configured to prompt the user for vehicle selection information indicative of a vehicle. In some embodiments, the user interface may include selectable graphics indicative of the one or more vehicles.

At step 404, graphic generation system 115 may receive vehicle selection information from user device 105. The vehicle selection information may be indicative of a vehicle selected by the user via the user interface of user device 105. In some embodiments, the user may select the vehicle, for example, for purchase, lease, or temporary rental. In response to the vehicle selection made by the user, user device 105 may transmit the vehicle selection information to graphic generation system 115.

In response to receiving the vehicle selection information from user device 105, graphic generation system 115 may obtain user data corresponding to the user at step 406. Graphic generation system 115 may obtain the user data from database 110. In some embodiments, in response to receiving the vehicle selection information, graphic generation system 115 may transmit a request to database 110 for the user data and database 110 may transmit the user data to graphic generation system 115 in response. The user data may be associated with the user of user device 105 and include the information described herein previously with reference to FIG. 1. As described herein previously, the user data may include prior vehicle information for one or more vehicles associated with the user and prior vehicle item information for one or more prior vehicle items associated with the one or more prior vehicles. The prior vehicle information may include the information described herein previously in reference to FIG. 1. The prior vehicle item information may include identifications of prior vehicle items selected for the prior vehicles associated with the user. For example, for a vehicle purchased or otherwise possessed by the user, the prior vehicle information may include an identification of prior vehicle items purchased or otherwise selected for the vehicle.

At step 408, once graphic generation system 115 has obtained the user data, graphic generation system 115 may determine whether a first vehicle item matches at least one prior vehicle item. If graphic generation system 115 determines that the first vehicle item matches at least one prior vehicle item, process 400 may proceed to step 410. If, on the other hand, graphic generation system 115 determines that the first vehicle item does not match at least one prior vehicle item, process 400 may end.

At step 410, in response to a determination that the first vehicle item matches at least one prior vehicle item, graphic generation system 115 may generate a first graphic indicative of the first vehicle item. The first graphic may be any graphic indicative or suggestive of the first vehicle item and suitable for display via the user interface of user device 105. At step 412, graphic generation system 115 may then cause user device 105 to display the graphic via the user interface.

While process 400 as depicted in FIG. 4 refers to a first vehicle item and a first graphic, it should be understood that steps 408 through 412 may be repeated for a second vehicle item, a third vehicle item, or any number of vehicle items. In some embodiments, a second graphic indicative of a second vehicle item and/or a third graphic indicative of a third vehicle item may be displayed concurrently via the user interface of user device 105 with the first graphic.

It is to be understood that process 400 need not necessarily be performed in the exact order described herein and the steps described herein may be rearranged in some embodiments. Further, in some embodiments fewer than all steps of process 400 may be performed and in some embodiments additional steps may be performed.

Process 400 as described herein may allow for generation and display of graphics indicative of vehicle items having a high likelihood of being selected by a user, while excluding graphics indicative of vehicle items having a low likelihood of being selected by the user. By leveraging user data for a user including prior vehicle information, process 400 may promote presentation of desirable vehicle items to the user and suppress presentation of undesirable vehicle items, thereby improving user experience, saving the user time, and promoting selection by the user of desirable vehicle items.

Further aspects of the disclosure are discussed below. It should be understood that embodiments in this disclosure are exemplary only, and that other embodiments may include various combinations of features from other embodiments, as well as additional or fewer features. While examples described herein previously pertain to vehicles, techniques disclosed herein may be applicable to any suitable product for which complementary products or add-on products are commonly purchased. For example, the techniques described may be applied to real estate, insurance, food delivery, online shopping generally, travel reservations, or the like.

In general, any process discussed in this disclosure that is understood to be computer-implementable, such as the processes illustrated in FIGS. 3 and 4, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
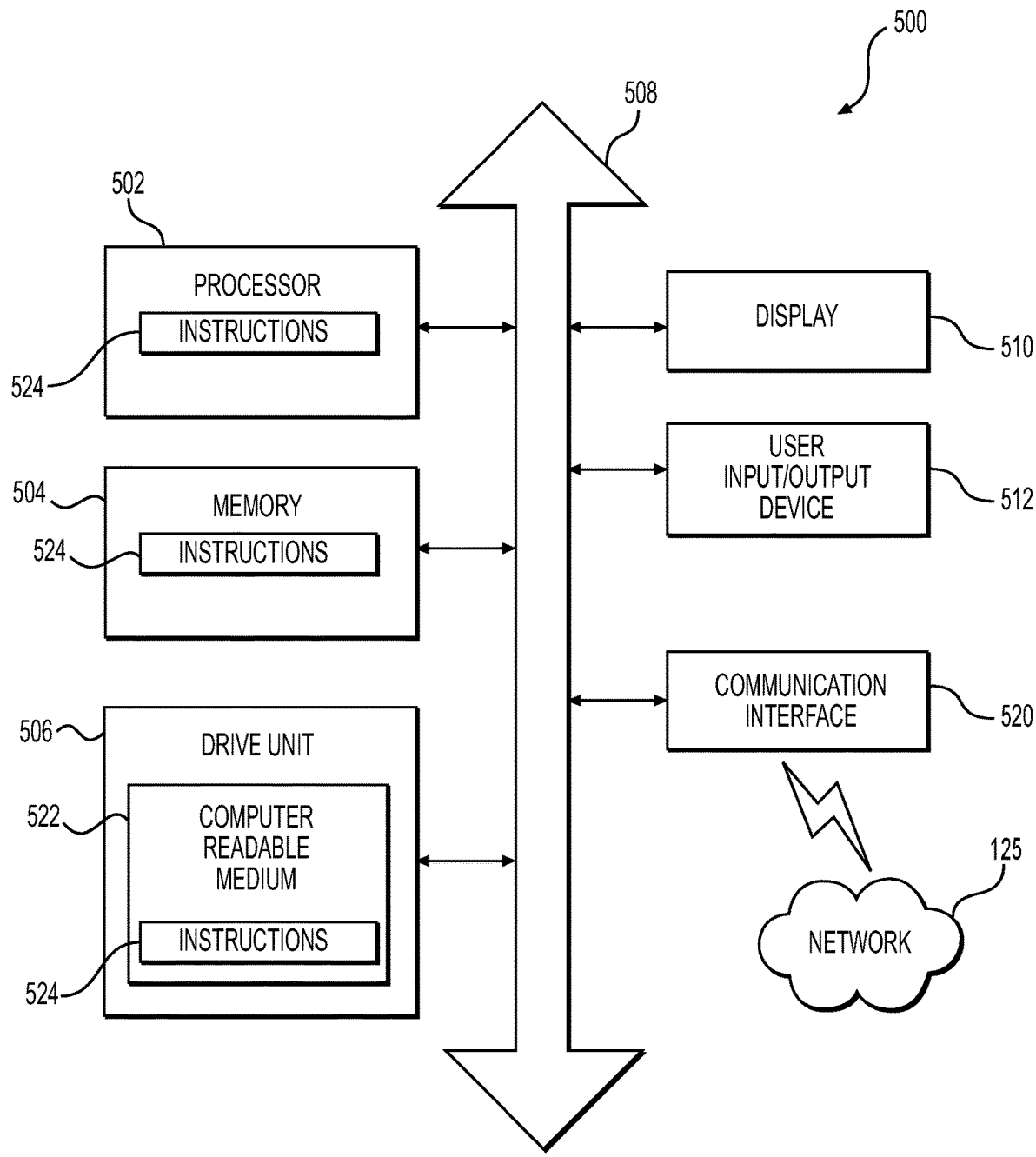
FIG. 5 depicts an example of a computing device, according to one or more embodiments.

FIG. 5 is a simplified functional block diagram of a computer system 500 that may be configured as a device for executing the process flow of FIG. 2 and/or the processes of FIGS. 3 and 4, according to exemplary embodiments of the present disclosure. FIG. 5 is a simplified functional block diagram of a computer that may be configured to serve as the user device 105, database 110, graphic generation system 115, and/or vehicle system 120, according to exemplary embodiments of the present disclosure. In some embodiments, user device 105, database 110, graphic generation system 115, and/or vehicle system 120 may include the components of FIG. 5 in addition to the specific components described herein previously. In various embodiments, any of the systems herein may be an assembly of hardware including, for example, a data communication interface 520 for packet data communication. The platform also may include a central processing unit ("CPU") 502, in the form of one or more processors, for executing program instructions. The platform may include an internal communication bus 508, and a storage unit 506 (such as ROM, HDD, SDD, etc.) that may store data on a computer readable medium 522, although the system 500 may receive programming and data via network communications including via network 125. The system 500 may also have a memory 504 (such as RAM) storing instructions 524 for executing techniques presented herein, although the instructions 524 may be stored temporarily or permanently within other modules of system 500 (e.g., processor 502 and/or computer readable medium 522). The system 500 also may include input and output ports 512 and/or a display 510 to connect with input and output devices such as keyboards, mice, touchscreens, monitors, displays, etc. The various system functions may be implemented in a distributed fashion on a number of similar platforms to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to generating graphics for vehicle items, it should be appreciated that the presently disclosed embodiments may be applicable to generating graphics for other purposes.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes depicted in FIGS. 3 and 4 and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method of generating a graphic for a vehicle item, the method comprising:
causing a user device to display a user interface indicative of one or more vehicles;
receiving, from the user device, vehicle selection information, the vehicle selection information indicative of a vehicle selected by a user;
obtaining, from a database, user data corresponding to the user, the user data including one or more of (1) a set of user interaction data and (2) prior vehicle information for one or more prior vehicles associated with the user;
generating, using a machine learning model based on the user data, a first score corresponding to a first vehicle item associated with the vehicle selected by the user, wherein the first vehicle item is one of a warranty, an insurance policy, or a service agreement, and wherein the machine learning model is:
trained to learn associations between at least (i) a set of user population data including interaction data and prior vehicle information corresponding to individuals of a user population and (ii) a set of vehicle item selections, wherein each of the vehicle item selections correspond to a subset of the user population data; and
configured to generate the first score based on the first vehicle item using the learned associations;
determining whether the first score exceeds a first predetermined score threshold;
generating, in response to a determination that the first score exceeds the first predetermined score threshold, a first graphic indicative of the first vehicle item; and
causing the user device to display the first graphic via the user interface.

2. The computer-implemented method of claim 1, further comprising:

receiving, from the user device, first vehicle item selection information indicating selection of the first vehicle item by the user.

3. The computer-implemented method of claim 2, further comprising:
updating the machine learning model based on the user data and the first vehicle item selection information.

4. The computer-implemented method of claim 1, further comprising:
generating, using the machine learning model, a second score corresponding to a second vehicle item based on the user data;
determining whether the second score exceeds a second predetermined score threshold;
generating, in response to a determination that the second score exceeds the second predetermined score threshold, a second graphic indicative of the second vehicle item; and
causing the user device to display the second graphic concurrently with the first graphic via the user interface.

5. The computer-implemented method of claim 4, further comprising:
receiving, from the user device, vehicle item selection information indicating selection of the first vehicle item and the second vehicle item by the user; and
updating the machine learning model based on the user data and the vehicle item selection information.

6. The computer-implemented method of claim 1, further comprising:
generating, using the machine learning model, a second score corresponding to a second vehicle item based on the user data;
determining whether the second score exceeds a second predetermined score threshold; and
causing, in response to a determination that the second score does not exceed the second predetermined score threshold, the user device to continue to display the first graphic via the user interface without adding a second graphic indicative of the second vehicle item.

7. The computer-implemented method of claim 1, wherein the set of user interaction data comprises at least one of: an identification of interactions, a location corresponding to each of the interactions, or a time corresponding to each of the interactions.

8. The computer-implemented method of claim 1, wherein the prior vehicle information is indicative of one or more prior vehicle items previously selected by the user for the one or more prior vehicles.

9. The computer-implemented method of claim 1, wherein the prior vehicle information is indicative of an accident involving at least one of the prior vehicles.

10. The computer-implemented method of claim 1, wherein the user data includes both of (1) the set of user interaction data and (2) the prior vehicle information; and
the prior vehicle information is indicative of a repair made to at least one of the prior vehicles.

11. The computer-implemented method of claim 1, further comprising:
receiving threshold adjustment information indicative of a request to adjust the first predetermined score threshold; and
adjusting the first predetermined score threshold.

12. The computer-implemented method of claim 1, wherein the first graphic is indicative of the first score.

13. The computer-implemented method of claim 1, wherein the machine learning model is a logistic regression model.

14. A system for generating a graphic for a vehicle item comprising:
one or more memories storing instructions and a machine learning model, wherein the machine learning model is:
trained to learn associations between at least (i) a set of user population data including interaction data and prior vehicle information corresponding to individuals of a user population and (ii) a set of vehicle item selections, each of the vehicle item selections corresponding to a subset of the user population data; and
configured to generate scores based on vehicle items using the learned associations; and
one or more processors operatively connected to the one or more memories, the one or more processors configured to execute the instructions to:
cause a user device to display a user interface indicative of one or more vehicles;
receive, from the user device, vehicle selection information, the vehicle selection information being indicative of a vehicle selected by a user;
obtain, from a database, user data corresponding to the user, the user data including one or more of (1) a set of user interaction data and (2) prior vehicle information for one or more prior vehicles associated with the user;
generate, using the machine learning model, a first score corresponding to a first vehicle item associated with the vehicle selected by the user and a second score corresponding to a second vehicle item associated with the vehicle selected by the user, wherein the first vehicle item and second vehicle item are each one of a warranty, an insurance policy, or a service agreement;
determine whether the first score exceeds a first predetermined score threshold;
determine whether the second score exceeds a second predetermined score threshold;
generate, in response to a determination that the first score exceeds the first predetermined score threshold and that the second score does not exceed the second predetermined threshold, a graphic indicative of the first vehicle item and not the second vehicle item; and
cause the user device to display the graphic via the user interface of the user device.

15. The system of claim 14, wherein the one or more processors are further configured to execute the instructions to:
receive, from the user device, first vehicle item selection information indicating selection of the first vehicle item by the user; and
update the machine learning model based on the user data and the first vehicle item selection information.

16. A non-transitory computer-readable storage medium storing program instructions that are computer-executable to implement operations comprising:
causing a user device to display a user interface indicative of one or more vehicles;
receiving, from the user device, vehicle selection information, the vehicle selection information indicative of a vehicle selected by a user;
obtaining, from a database, user data corresponding to the user, the user data including one or more of (1) a set of user interaction data and (2) prior vehicle information for one or more prior vehicles associated with the user;

generating, using a machine learning model based on the user data, a first score corresponding to a first vehicle item associated with the vehicle selected by the user, wherein the first vehicle item is one of a warranty, an insurance policy, or a service agreement, and wherein the machine learning model is:

trained to learn associations between at least (i) a set of user population data including interaction data and prior vehicle information corresponding to individuals of a user population and (ii) a set of vehicle item selections, wherein each of the vehicle item selections correspond to a subset of the user population data; and configured to generate the first score based on the first vehicle item using the learned associations;

determining whether the first score exceeds a first predetermined score threshold;

generating, in response to a determination that the first score exceeds the first predetermined score threshold, a first graphic indicative of the first vehicle item; and causing the user device to display the first graphic via the user interface.

17. The non-transitory computer-readable storage medium of claim 16, wherein the operations further comprise:

receiving, from the user device, first vehicle item selection information indicating selection of the first vehicle item by the user.

18. The non-transitory computer-readable storage medium of claim 17, wherein the operations further comprise:

updating the machine learning model based on the user data and the first vehicle item selection information.

19. The non-transitory computer-readable storage medium of claim 16, wherein the operations further comprise:

generating, using the machine learning model, a second score corresponding to a second vehicle item based on the user data;

determining whether the second score exceeds a second predetermined score threshold;

generating, in response to a determination that the second score exceeds the second predetermined score threshold, a second graphic indicative of the second vehicle item; and causing the user device to display the second graphic concurrently with the first graphic via the user interface.

20. The non-transitory computer-readable storage medium of claim 19, wherein the operations further comprise:

receiving, from the user device, vehicle item selection information indicating selection of the first vehicle item and the second vehicle item by the user; and updating the machine learning model based on the user data and the vehicle item selection information.

* * * * *